United States Patent [19]

Fortin et al.

[11] 4,138,901
[45] Feb. 13, 1979

[54] SPEED REDUCER, PARTICULARLY FOR DRIVING A PROPELLER

[75] Inventors: Raymond Fortin, Fresnes; Francois Peroy, Bourg La Reine, both of France

[73] Assignee: Regie Nationale des Usines Renault, Billancourt, France

[21] Appl. No.: 768,762

[22] Filed: Feb. 15, 1977

[30] Foreign Application Priority Data

Feb. 16, 1976 [FR] France ............................... 76 04167

[51] Int. Cl.² .......................... F16H 7/00; F16H 7/10
[52] U.S. Cl. .................................... 74/219; 74/242.16
[58] Field of Search ................... 74/216.5, 217 R, 219, 74/234, 242.16

[56] References Cited

U.S. PATENT DOCUMENTS

| | | | |
|---|---|---|---|
| 2,010,796 | 8/1935 | Bourque | 74/216.5 |
| 2,909,074 | 10/1959 | Scheiterlein | 74/242.16 |
| 2,911,961 | 11/1959 | McRae | 74/217 R X |
| 3,360,998 | 1/1968 | Griffel | 74/216.5 |
| 3,863,517 | 2/1975 | Pareja | 74/242.16 |

*Primary Examiner*—Leonard H. Gerin
*Attorney, Agent, or Firm*—Oblon, Fisher, Spivak, McClelland & Maier

[57] ABSTRACT

A belt-drive speed reducer, particularly for driving an airplane propeller from a standard automobile engine, features a protective housing attached to the motor, being supported by suitable borings 22 and 40 of the shaft of a drive pulley 10, on the one hand, turned by the motor crankshaft and, on the other hand, the propeller shaft supporting a driven pulley turned by a belt which, in section, exhibits V-shaped ribs. The bearing of the propeller shaft has on its periphery a disk eccentric with respect to the propeller shaft, the rotation of which disk in the boring of the housing regulates the tension of the belt.

8 Claims, 4 Drawing Figures

SPEED REDUCER, PARTICULARLY FOR DRIVING A PROPELLER

BACKGROUND OF THE INVENTION

1. Field of the Invention

The present invention concerns the adaptation of internal combustion engines to driving a propeller and relates more particularly to a belt-drive speed reducer, lodged in a housing, permitting reconciliation of motor speed to propeller speed.

2. Description of the Prior Art

Standard automobile engines are more efficient at speeds between 4000 and 6000 RPM. To apply these engines to the driving of an airplane propeller, it is necessary to reduce the speed in a ratio ranging from 2.5 to 1 to improve the efficiency of the propeller and, at the same time, to reduce the propeller noise.

Many types of reducers have already been realized. Among them can be particularly cited spur-gear reducers. However, because they are very heavy, their use has gradually declined. Chain-drive reducers are reputed to be unreliable, so that their use on aircraft is actually believed to be illegal. There have also been conceived continuous speed changers, based on the rolling of smooth cylinders, cones or balls in tight contact. But these polished bodies, with point contacts, either flatten under the pressure necessary for transmission of the force or slip with respect to one another, this in spite of the use of special lubricants the viscosity of which increases with the pressure, the traction obtained not being sufficient for effective operation of the reducer.

A first category of reducers, driven by belts, presents itself more favorably. These reducers consist very simply of a drive pulley turned by the motor crankshaft, this drive pulley transmitting its rotary motion, through the intermediary of a belt, to a driven pulley, itself turning a propeller shaft. The assembly is enclosed in a protective housing attached to the motor.

The belts commonly used are certainly quite durable, but they overheat, due to slippage, particularly in the resonance regime of the motor. The use of a tensioning idler pulley is not to be considered for several reasons, one being that installing it inside the housing presents difficulties and the two supplementary flexions, which it imposes on the belt, would result in premature fatiguing of the latter while decreasing the contact arcs around the drive and driven pulleys, thus favoring slippage. Besides, in view of the linear speed of the belt, a small diameter tensioning idler would turn at a very high angular velocity, poducing excessive parasitic noise. Finally, in a belt reducer driven from an automobile engine crankshaft, the latter does not bear well the lateral tension exerted on it by the belt without important technologic modifications.

SUMMARY OF THE INVENTION

An object of the present invention is to provide a belt reducer which avoids the above drawbacks and which, in particular, allows adjustment of the belt tension in a simple and effective manner which eliminates the need for an idler, while easing the lateral tension exerted on the crankshaft by the belt.

To this end, the foregoing object of the invention is attained through the provision of a speed reducer interposed between the output shaft of an internal combustion engine and a propeller, such comprising a housing enclosing a drive pulley driven at one end by the motor crankshaft, the drive pulley transmitting its rotary motion, through the intermediary of a belt, to a driven pulley, itself turning a propeller shaft, and being characterized by the fact that one side wall of the housing is attached to the motor, while the opposite wall of the housing supports, by suitable borings, a fixed shaft on the other end of the drive pulley, on the one hand, and an adjustable bearing of the propeller shaft on the other.

According to another characteristic of the invention, the adjustable bearing of the propeller shaft contains two roller bearings, one inside and one outside the housing, and exhibits on its periphery a mounting flange furnished with a recessed centering disk, the diameter of which is smaller than that of the flange, which fits into the boring in the housing, the common axis of the boring, the flange and the disk being offset with respect to the axis of the propeller shaft.

Other objects, features and attendant advantages of the invention will be more fully appreciated as the same becomes better understood from the following detailed description when considered in connection with the attached drawings in which.

DETAILED DESCRIPTION OF THE ILLUSTRATED EMBODIMENTS

Figure 1:
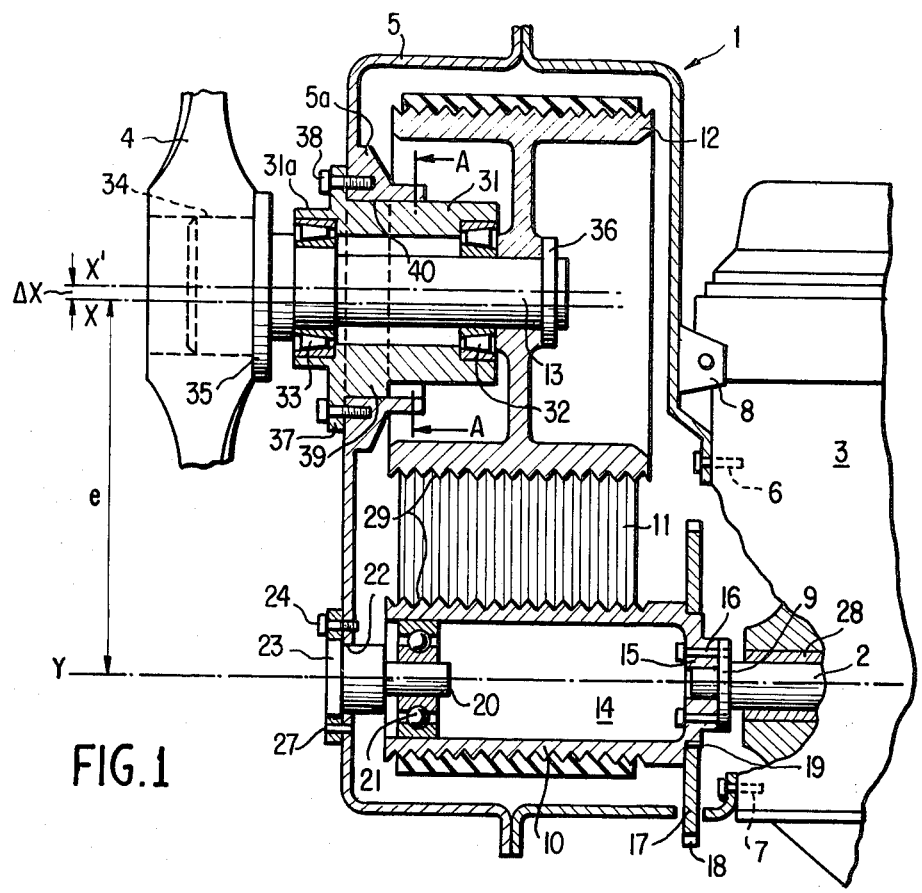
FIG. 1 shows, in cross section, the belt speed reducer of the present invention.

Referring now to the drawing, in FIG. 1 there is shown a speed reducer 1 interposed between the output shaft 2 of a standard automobile engine 3 and an airplane propeller 4. The speed reducer is enclosed and protected by a housing 5, constructed of 0.5 to 1 cm thick sheet steel, made in two sections assembled by conventional means, not shown, and fastened to the motor 3 at the place normally occupied by the transmission by means of a set of bolts, such as 6 and 7, and possibly by an upper reinforcing lug 8. The drive coupling is realized by a flange plate 9 of crank shaft 2 to which is attached a drive pulley 10 of the reducer which transmits its rotary motion, through the intermediary of a belt 11, to a driven pulley 12 having a diameter greater than that of the drive pulley 10 in a ratio equal to the reduction ratio of reducer 1. The driven pulley 12 drives in turn a propeller shaft 13 to which it is keyed and thus communicates its rotary motion to airplane propeller 4.

Figure 3:
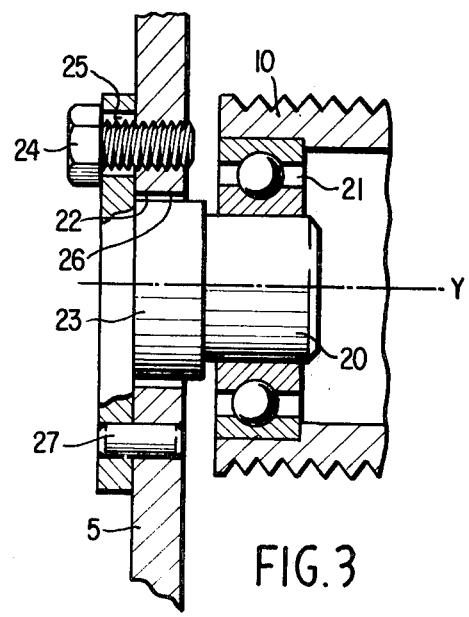
FIG. 3 is an enlarged cross section of the fixed shaft of the drive pulley.

The drive pulley 10 is preferably a tubular aluminum piece, one end of which terminates in a cap 14, pierced in its center by a boring to form a mounting flange 15, which is turned outwards from the tubular piece and fastened to the crankshaft flange plate 9 with screws 16. A large-diameter steel plate 17 having a toothed rim 18 for starting the motor is shrunk onto the aluminum tube 10 in the plane of the mounting flange 15. The assembly is additionally blocked in rotation by means of a pin 19 introduced half in plate 17 and half in the tubular piece 10. The other end of the drive pulley 10 turns on a fixed shaft 20, best shown in FIG. 3, through the intermediary of a ball bearing 21. According to a characteristic of the invention, this shaft 20 is supported by the reducer housing 5, passing through a boring 22, slightly larger in diameter than the shaft, to permit centering it correctly on the extension of the crankshaft axis Y. The fixed shaft 20 is fastened to housing 5 by means of an external flange 23 traversed by a set of screws 24 which screw into the housing 5, but with a play 25 in flange 23 corresponding to the play 26 between shaft 20 and the boring 22 in the housing. The fixed shaft 20 is then clamped to the housing by tightening the screws 24, after correct centering of the shaft, which cannot be accomplished until the housing 5 has been fastened to the motor 3. Final centering of shaft 20 in a satisfactory position, determined by trial rotation of the drive pulley 10 by the motor, is realized by means of at least one centering pin 27 set in place at the last moment in a hole drilled in housing 5, after making the favorable position and tightening down the screws on the flange 23. It is apparent that, thanks to this method of construction, the lateral pull exerted by the belt 11 on drive pulley 10 is equall distributed between the crankshaft 2 and the housing 5 of the reducer, thus avoiding any abnormal loading of crankshaft bearing 28.

Figure 4:
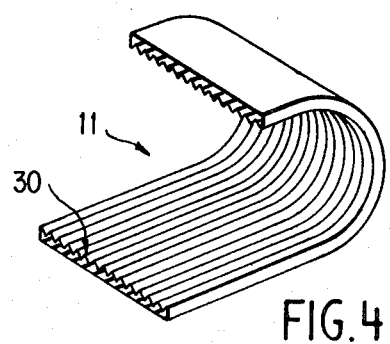
FIG. 4 shows, in perspective, a transmission belt of the present invention, with longitudinal ribs of V-shaped cross section provided thereon.

The driven pulley 12, keyed on propeller shaft 13, is also preferably of aluminum and is equal in width to the drive pulley 10. Aluminum is chosen for these two pulleys, in preference to another material, in order to reduce the weight of the reducer as much as possible. The drive and driven pulleys exhibit, on their working surfaces, a set of circumferential V-shaped grooves 30 intended to mesh with the complementary V-shaped ribs 29 on the transmission belt 11. FIG. 4 shows the type of belt used, known for its qualities of good adherence and lightness, and permitting the transmission of high powers in spite of the small dimensions of the belt. Actually, the soft rubber of which it is made permits utilizing for power transmission the entire area of contact between the belt 11 and the pulleys 10, 12, thanks to the compression of the rubber exerted by the tension or the load applied to the belt. The coefficient of friction between the pulleys and the belt is increased by treating the outer working surfaces of the drive and driven pulleys by a conventional hard anodizing process.

Figure 2:
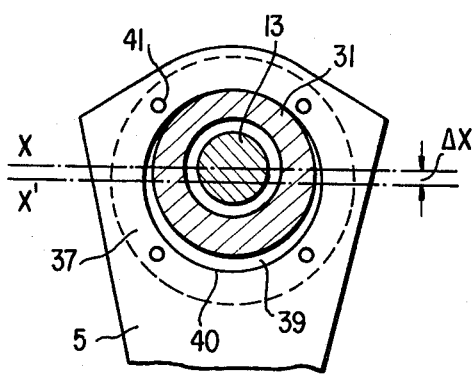
FIG. 2 shows, in cross section, the adjustable bearing of the propeller shaft, taken along the line AA in FIG. 1.

The propeller shaft 13 turns within a bearing 31 between two cone-roller bearings, one cone-roller bearing 32 being inside and another cone-roller bearing 33 being outside the wall of reducer housing 5, and in its turn drives the airplane propeller 4 through the intermediary of a hub 34 and a propeller flange 35 fastened to the propeller 4 by conventional methods, not shown. The bearing 31, of cylindrical form, enclosed the propeller shaft 13 over the greater part of its length, so that the driven pulley 12 is restrained axially between the bearing 31 and a stop 36. The bearing has on its periphery a mounting flange 37 for attaching it with screws 38 to the housing, internally reinforced at this point by a shoulder 5a, while a centering disk 39, adjacent to the flange 37, fits in a boring 40 of the same diameter through a thickened portion of the housing wall leaving the shoulder 5a. According to another characteristic of the invention, the common axis X of the boring 40 in the housing, centering disk 39 and mounting flange 37 is offset from the axis X' of the propeller shaft 13 and thus of bearing 31. This offset ΔX is more easily seen in FIG. 2 between the boring 40 in the housing and the propeller shaft 13, its purpose being to adjust the tension of the belt 11. The propeller-shaft bearing 13 may be considered to be adjustable in the sense that, when the mounting flange 37 is rotated by a predetermined amount, by means of an adjusting square 31a on the contour of the bearing 31 exterior to the housing 5, the disk 39 turns in the boring 40 in the housing around their common axis X (fixed), which results in turning the axis X' (variable) of the propeller shaft 13 about the axis X. The locus of X' is thus a cylinder with axis X and radius ΔX. Considering the distance e = $\overline{XY}$, between the axis Y of the drive pulley and X of the driven pulley, one sees that e varies between XY + ΔX and $\overline{XY}$ − ΔX passing through all the intermediate values, when one adjusts the angular position of the bearing flange 37, the maximum belt tension occurring for $\overline{XY}$ + ΔX. FIG. 1, on the contrary, corresponds to the minimum tension since the separation ΔX between the centering disk 39 and the contour of bearing 31 appears at the bottom of the boring 40. For making a precise adjustment, the mounting flange 37 of the bearing is furnished with a large number of orifices, while a few threaded holes 41 in the housing 5 suffice for the introduction of the screws 38 (FIGS. 1 and 2). The eccentric tensioning arrangement just described eliminates the need for a cumbersome, heavy and noisy tensioning idler pulley. The upper boring 40 of the housing supports the assembly consisting of the driven pulley 12, the bearing 31, the propeller shaft 13 and the propeller 4, as well as the force exerted by the tension of the belt 11. That is why it is necessary to reinforce the structure of the housing at the boring 40 by the shoulder 5a shown in FIG. 1 or by ribs which may assume diverse forms.

Numerous variations of the embodiment of the invention just described are obviously possible. Thus, in particular, one may use other materials than aluminum in making the pulleys 10 and 12, provided that their weight remains within reasonable limits. With regard to the belt 11, its cross section with V-shaped teeth gives very good results, but one could also use a belt of trapezoidal cross section or of another type. In another variation, the propeller shaft 13 may be prolonged in the direction away from the propeller 4 in such a way as to turn in a second adjustable bearing provided with an eccentric supported by a second boring in the rear side wall of the housing 5, which would improve the rigidity of the assembly vis-a-vis the tension of the belt. The realization described is the simplest possible and answers, above all, the need for lightness of the reducer.

The reducer of the invention, besides being used to drive an airplane propeller, may be applied to any other device requiring a change in angular velocity in a fixed ratio.

What is claimed as new and desired to be secured by letters patent of the United States is:

1. A speed reducer interposed between the output shaft of an internal combustion engine and a propeller, comprising:
  a housing enclosing a drive pulley driven at one end by the motor crankshaft;
  the drive pulley of said motor crankshaft transmitting its rotary motion, through the intermediary of a belt, to a driven pulley, itself turning said propeller shaft;
  characterized by the fact that one side wall of the housing is attached to the motor while the opposite wall of the housing supports, by suitable borings, a fixed shaft on the other end of the drive pulley on the one hand, and an adjustable bearing of the propeller shaft on the other hand.

2. A speed reducer as set forth in claim 1, wherein said adjustable bearing of the propeller shaft holds two roller bearings, one inside and one outside the housing, and has on its periphery a mounting flange furnished with a recessed centering disk of smaller diameter than said flange and fitting in said boring in the housing, the common axis of the boring, the flange and the disk being offset from the axis of the propeller shaft.

3. A speed reducer as set forth in claim 2, wherein a predetermined rotation of the said flange of the adjustable bearing makes the axis of the propeller shaft rotate about the common axis because of its offset, thus varying the distance between the axis of the drive pulley and that of the driven pulley and thereby realizing the adjustment of the tension of the belt.

4. A reducer as set forth in claim 1, wherein said drive pulley is a tubular piece of which one end is directly attached to the drive-coupling flange plate of the crankshaft and the other end of which turns on the fixed shaft through the intermediary of a ball bearing.

5. A speed reducer as set forth in claim 4, wherein said drive pulley and said driven pulley are of aluminum and have on their periphery a set of circumferential V-shaped grooves meshing with the complementary V-shaped ribs on the belt.

6. A speed reducer as set forth in claim 5, characterized by the fact that the working surfaces of the drive and driven pulleys are treated by a hard anodizing process, intended to increase their coefficient of friction.

7. A speed reducer as set forth in claim 1, wherein said shaft of the drive pulley is fastened to the housing by a mounting flange and it is centered with respect to the drive pulley by means of at least one pin introduced into at least one hole drilled in the housing for this purpose.

8. A speed reducer as set forth in claim 1, wherein said driven pulley is keyed on the propeller shaft.

* * * * *